(12) United States Patent
Vorderstrasse et al.

(10) Patent No.: US 7,938,343 B2
(45) Date of Patent: May 10, 2011

(54) SELF-PROPELLED IRRIGATION SYSTEM WITH ARTICULATED DRIVE TOWER

(75) Inventors: Spencer L. Vorderstrasse, Hebron, NE (US); Bradley G. Weatherl, Fairbury, NE (US); John E. Davis, Hebron, NE (US)

(73) Assignee: Reinke Manufacturing Company, Inc., Deshler, NE (US)

( * ) Notice: Subject to any disclaimer, the term of this patent is extended or adjusted under 35 U.S.C. 154(b) by 177 days.

(21) Appl. No.: 12/353,518

(22) Filed: Jan. 14, 2009

(65) Prior Publication Data

US 2010/0176225 A1  Jul. 15, 2010

(51) Int. Cl.
*B05B 3/00* (2006.01)
*B05B 3/18* (2006.01)
*E21F 17/02* (2006.01)
*F16L 3/00* (2006.01)

(52) U.S. Cl. ........ 239/744; 239/722; 239/739; 239/743; 248/58

(58) Field of Classification Search .......... 239/722–754; 248/58–64, 75–93
See application file for complete search history.

(56) References Cited

U.S. PATENT DOCUMENTS

| | | | | |
|---|---|---|---|---|
| RE26,285 E | * | 10/1967 | Stafford | ........................ 239/735 |
| 3,519,206 A | * | 7/1970 | Leaders | ........................ 239/735 |
| 3,766,937 A | * | 10/1973 | Lundvall et al. | ............... 239/731 |
| 5,862,997 A | * | 1/1999 | Reinke | ........................... 239/728 |
| 6,131,833 A | | 10/2000 | Chapman | |
| 6,805,311 B2 | * | 10/2004 | Buller | ........................... 239/722 |
| 7,229,032 B1 | | 6/2007 | Christensen et al. | |

FOREIGN PATENT DOCUMENTS

EP        387465 A1 *  9/1990

* cited by examiner

*Primary Examiner* — Dinh Q Nguyen
*Assistant Examiner* — James S Hogan
(74) *Attorney, Agent, or Firm* — Jeffrey L. Thompson; Thompson & Thompson, PA

(57) ABSTRACT

A self-propelled irrigation system has an elongated pipeline supported above a field by a plurality of drive towers. The drive towers each have a base beam assembly, a tower structure extending above the base beam assembly for supporting the elongated pipeline, and a plurality of drive wheel assemblies for moving the base beam assembly over a field. The drive assemblies include first and second drive assemblies mounted to respective ends of the base beam assembly. At least one of the drive towers also has a third drive assembly mounted to the base beam assembly between the first and second drive assemblies. The base beam assembly supporting the third drive assembly is articulated between its first and second ends and pivotally connected to the lower ends of the tower structure to allow the third drive assembly to move vertically relative to the first and second drive assemblies when traversing uneven terrain.

19 Claims, 9 Drawing Sheets

SELF-PROPELLED IRRIGATION SYSTEM WITH ARTICULATED DRIVE TOWER

BACKGROUND OF THE INVENTION

1. Field of the Invention

The present invention relates generally to self-propelled irrigation systems and, in particular, to a drive unit for a tower of a self-propelled irrigation system that provides improved traction and flotation as the sprinkler traverses a field.

2. Description of the Related Art

Self-propelled irrigation systems are used to provide water for agricultural purposes in arid regions. Typically, such systems include a series of spaced drive towers connected by truss sections that support an elongated water distribution pipeline between the towers. In center pivot systems, the water distribution pipe extends radially from a central pivot connected to a water supply. In linear move irrigation systems, the water distribution pipe extends laterally from a canal feed or hose drag system that provides the water supply.

Water passing through the distribution pipeline is forced out through a number of sprinkler heads, spray guns, drop nozzles, or the like spaced along the length of the pipe. Each drive tower in the system is supported on wheels or other structures that are driven at slow speeds to move the tower in a circular path about the central pivot, or a linear path in the case of linear move systems, to thereby irrigate a large tract of land.

Conventional drive towers for self-propelled irrigation systems are each supported by an elongated base beam that extends transverse to the water pipeline with a drive wheel at each end of the base beam. The weight of the drive tower and the corresponding part of the water pipeline is approximately evenly distributed between the two drive wheels. However, in difficult terrain these two-wheeled drive towers sometimes become stuck or leave deep ruts in the field, which are undesirable.

There have been many attempts in the prior art to improve the flotation and traction of conventional drive towers for self-propelled irrigation systems. For example, there have been three-wheeled drive towers in which all three wheel assemblies are mounted to a rigid base beam. However, these drive towers do not maintain a constant weight distribution among the three wheels and often have one wheel come off the ground when the system traverses uneven terrain.

Additional attempts to improve drive towers are described in U.S. Pat. No. 6,131,833 issued to Chapman (tracked drive tower), and U.S. Pat. No. 7,229,032 issued to Christensen et al. (four-wheeled drive tower). However, these attempted solutions have been complex and expensive to implement and appear to have had only limited acceptance in the marketplace.

There is a need in the industry for an improved drive tower for self-propelled irrigation systems to allow the irrigation systems to traverse difficult and uneven terrain more easily.

SUMMARY OF THE INVENTION

An improved drive tower for self-propelled irrigation systems according to the present invention has a base beam assembly, a tower structure extending above the base beam assembly for supporting an elongated pipeline, and a plurality of drive wheel assemblies for moving the base beam assembly over a field. The drive assemblies include first and second drive assemblies mounted to respective ends of the base beam assembly, and a third drive assembly mounted to the base beam assembly between the first and second drive assemblies. The base beam assembly is articulated between its first and second ends and pivotally connected to the lower ends of the tower structure to allow the third drive assembly to move vertically relative to the first and second drive assemblies when traversing uneven terrain.

According to one broad aspect of the present invention, a drive tower for a self-propelled irrigation system is provided, comprising: a base beam assembly comprising a first beam member pivotally connected to a second beam member, the first and second beam members being rotatable relative to each other about a first pivot connection; a tower structure comprising first and second tower members, the first tower member being pivotally connected at its lower end to the first beam member about a second pivot connection, the second tower member being pivotally connected at its lower end to the second beam member about a third pivot connection, and the first and second tower members extending upwardly from the second and third pivot connections and converging together to support an elongated water pipeline above the base beam assembly; and a plurality of drive assemblies mounted to the base beam assembly for supporting and propelling the base beam assembly over a field.

According to another broad aspect of the present invention, a drive tower for a self-propelled irrigation system is provided, comprising: a base beam assembly; a tower structure supported by and extending above the base beam assembly for supporting an elongated water pipeline above the base beam assembly; a plurality of drive assemblies for supporting and propelling the base beam assembly over a field, the drive assemblies comprising first and second drive assemblies mounted to respective first and second ends of the base beam assembly, and a third drive assembly mounted to the base beam assembly between the first and second drive assemblies; and the base beam assembly being articulated at a location between its first and second ends to allow the third drive assembly to move vertically relative to the first and second drive assemblies when traversing uneven terrain.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

A self-propelled irrigation system 10 with an articulated drive tower according to the present invention will now be described in detail with reference with FIGS. 1 to 9 of the accompanying drawings.

Figure 1:
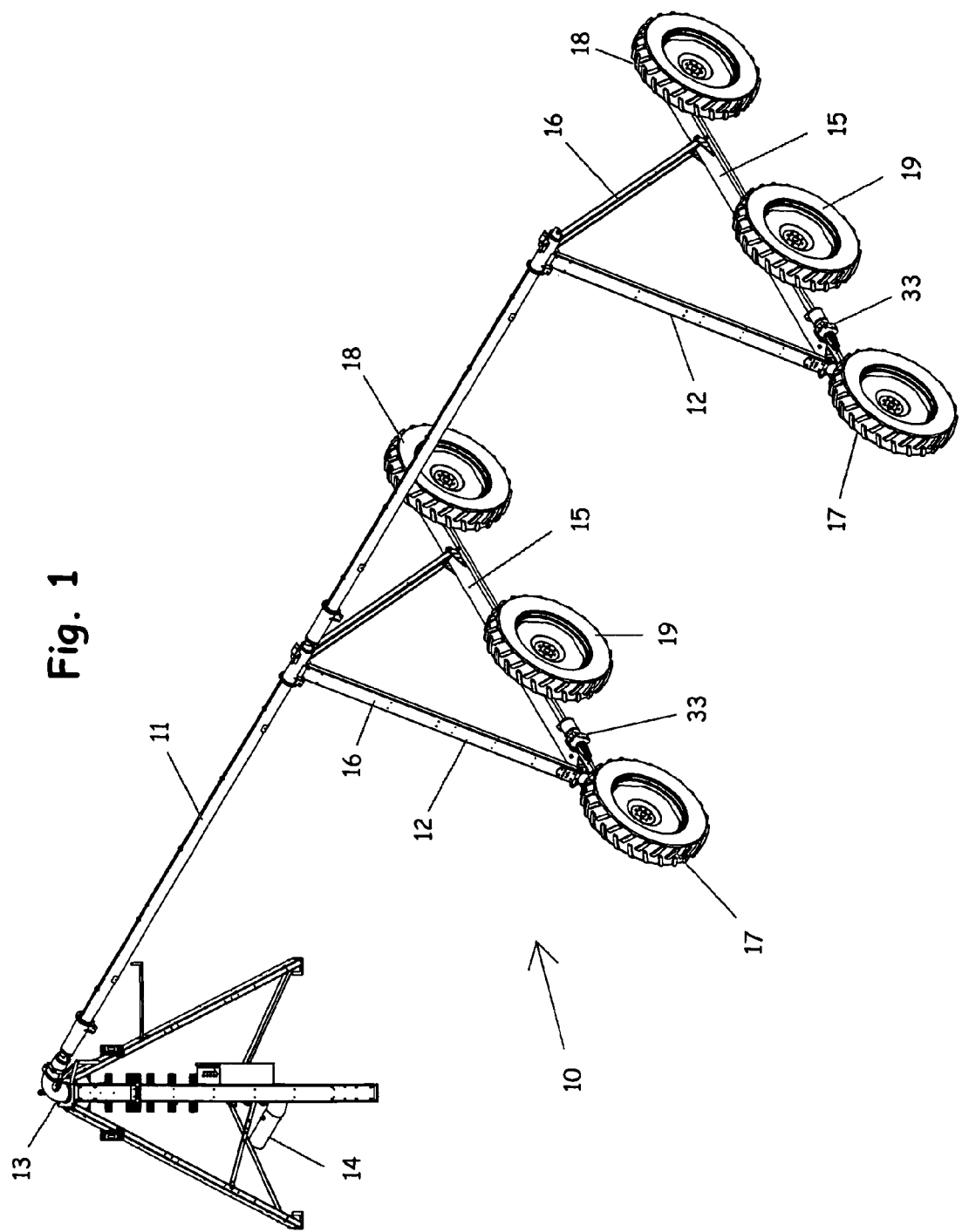
FIG. 1 is a perspective view of a center pivot sprinkler system having articulated drive towers supported by three drive wheel assemblies according to the present invention.
Figure 2:
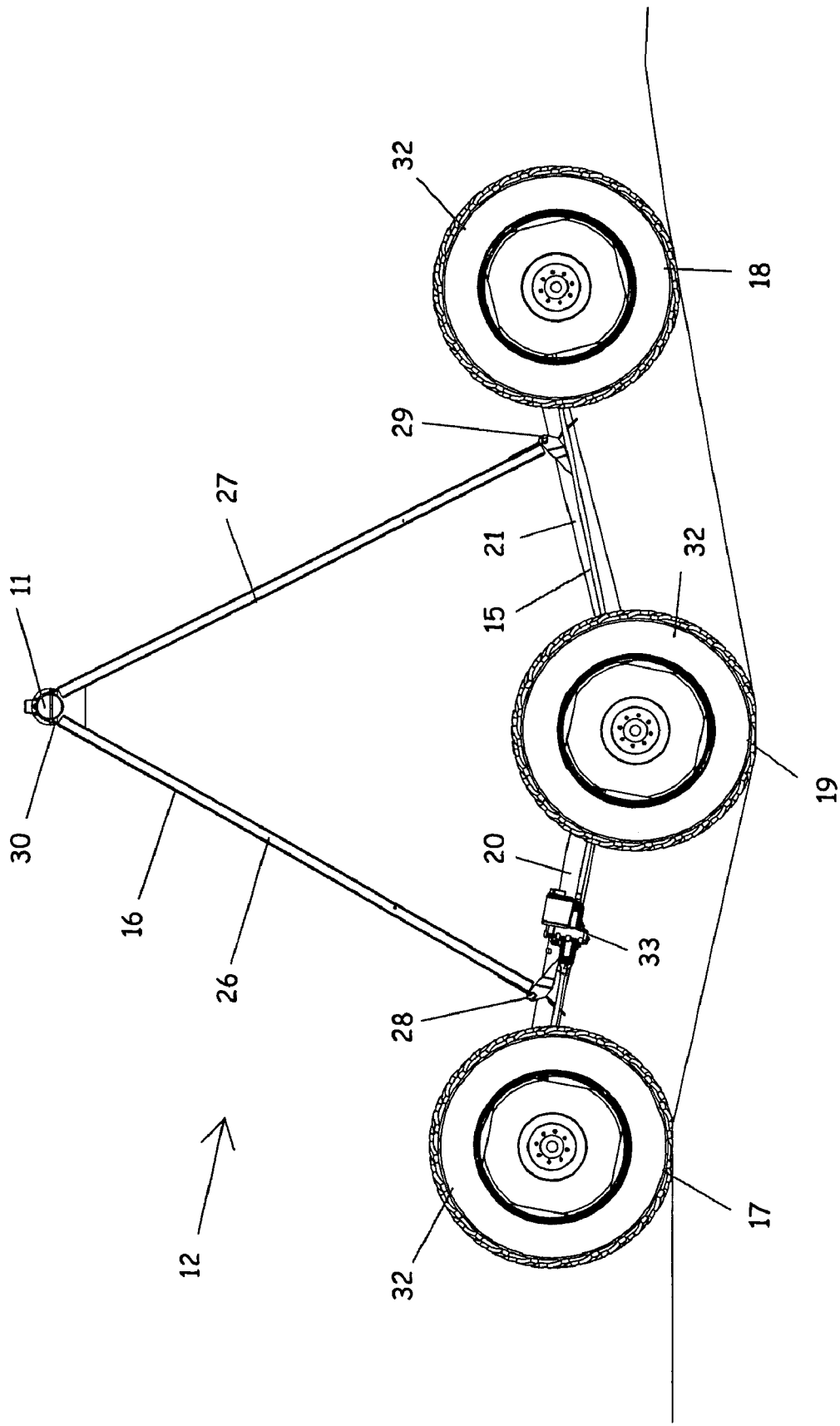
FIG. 2 is an elevation view of one of the articulated drive towers of the sprinkler system traversing uneven terrain.
Figure 3:
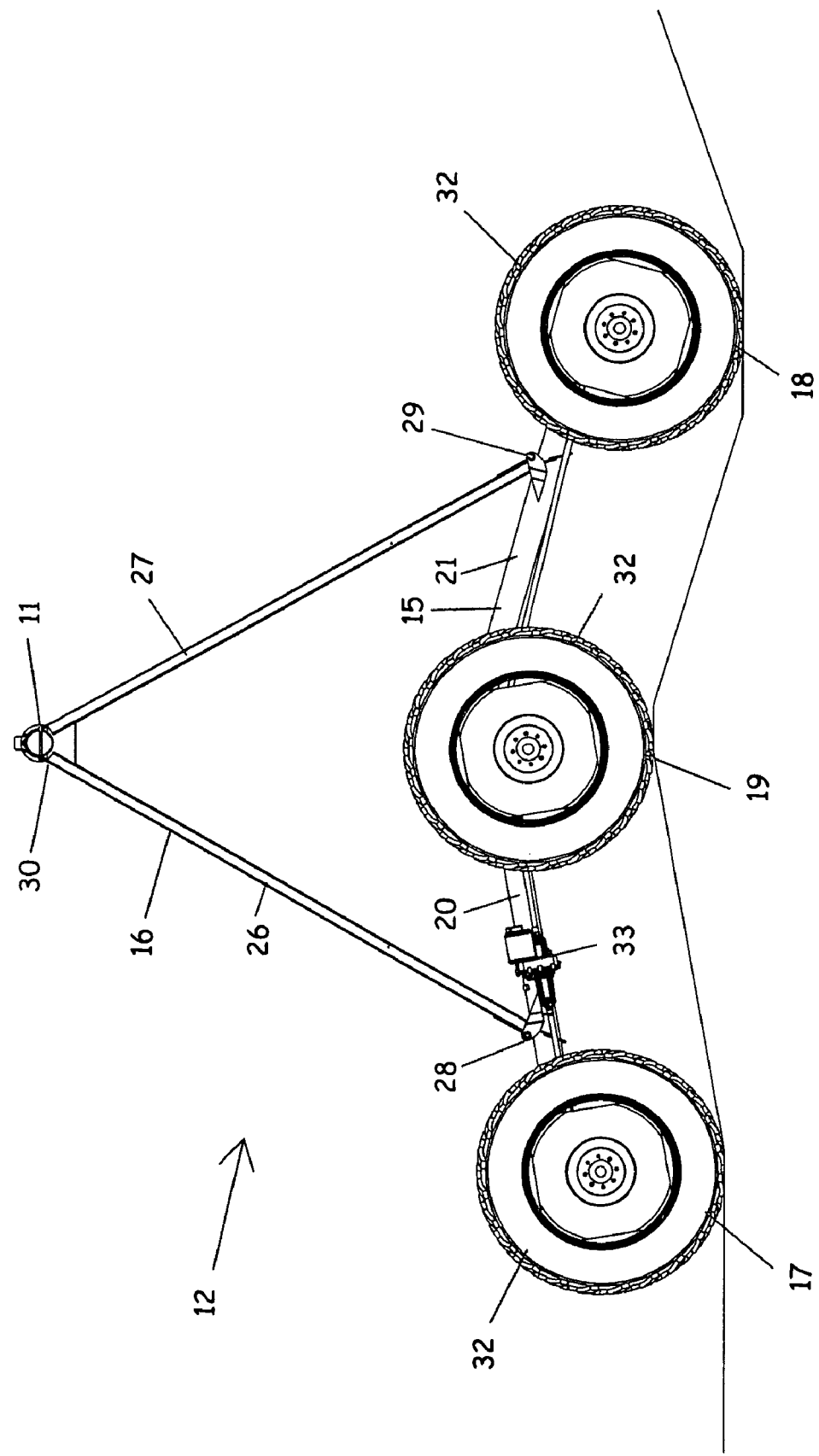
FIG. 3 is another elevation view of one of the articulated drive towers of the sprinkler system traversing uneven terrain.
Figure 4:
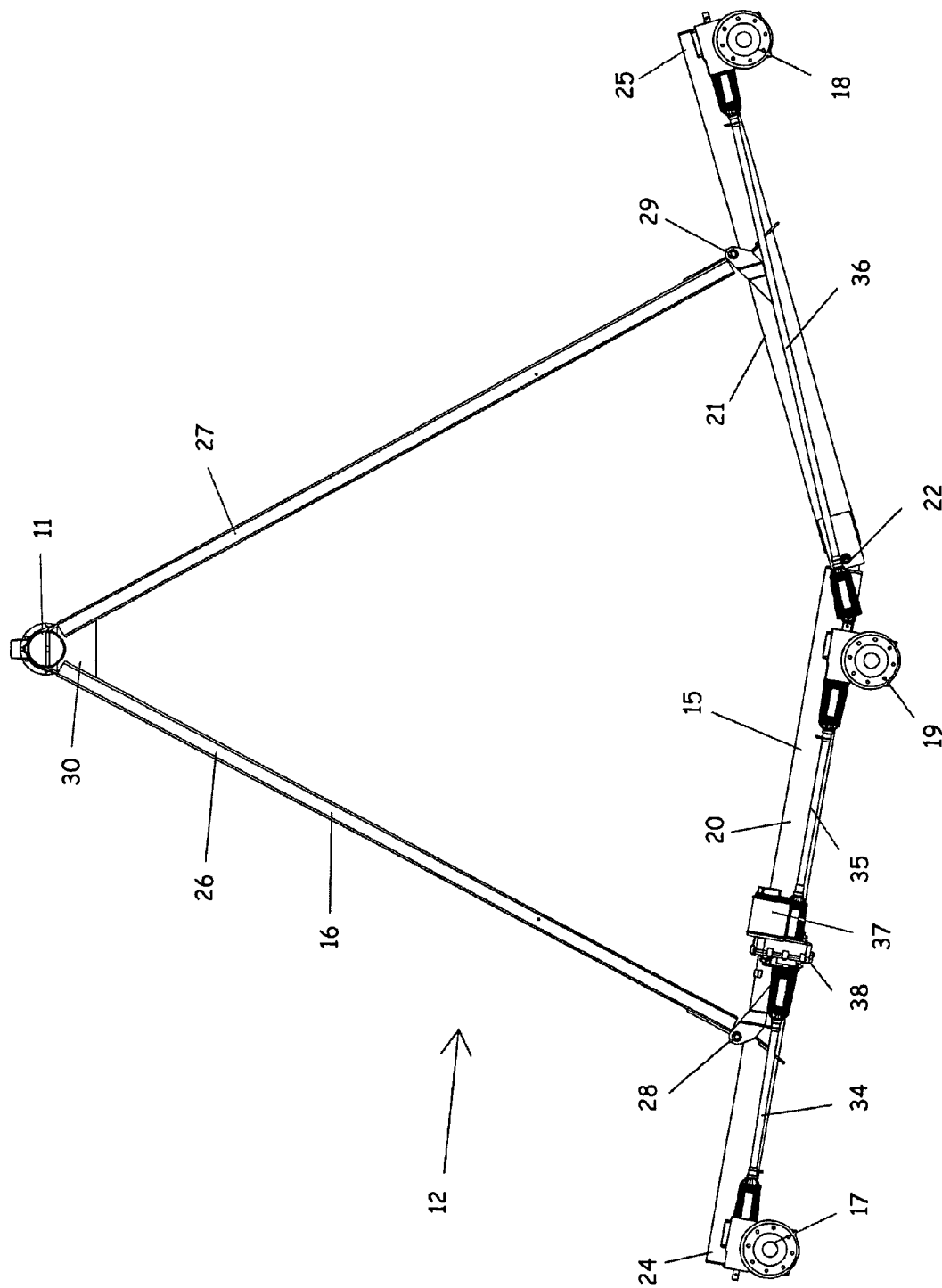
FIG. 4 is an elevation view of the articulated drive tower shown in FIG. 2 with the wheels removed.
Figure 5:
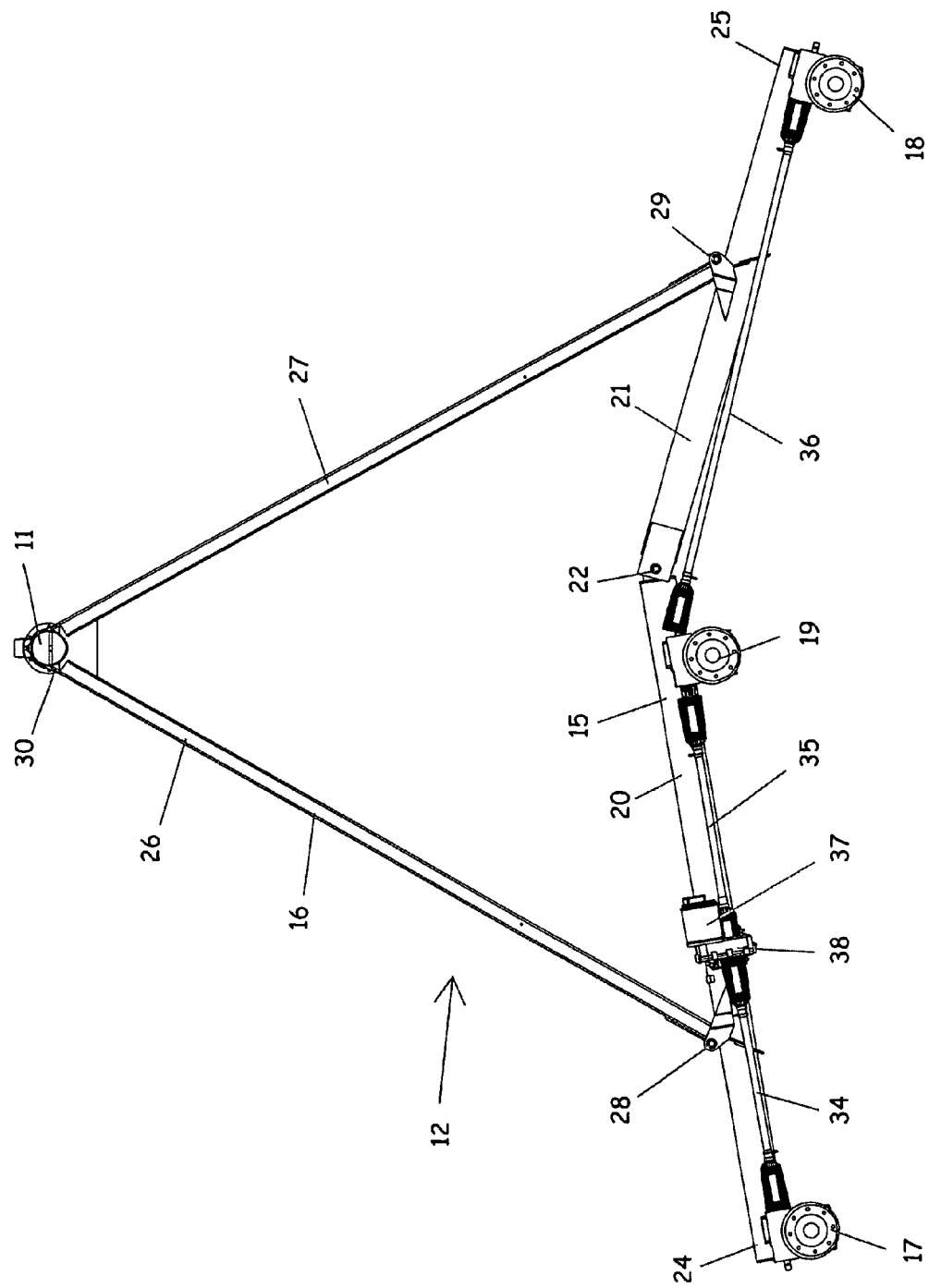
FIG. 5 is an elevation view of the articulated drive tower shown in FIG. 3 with the wheels removed.
Figure 6:
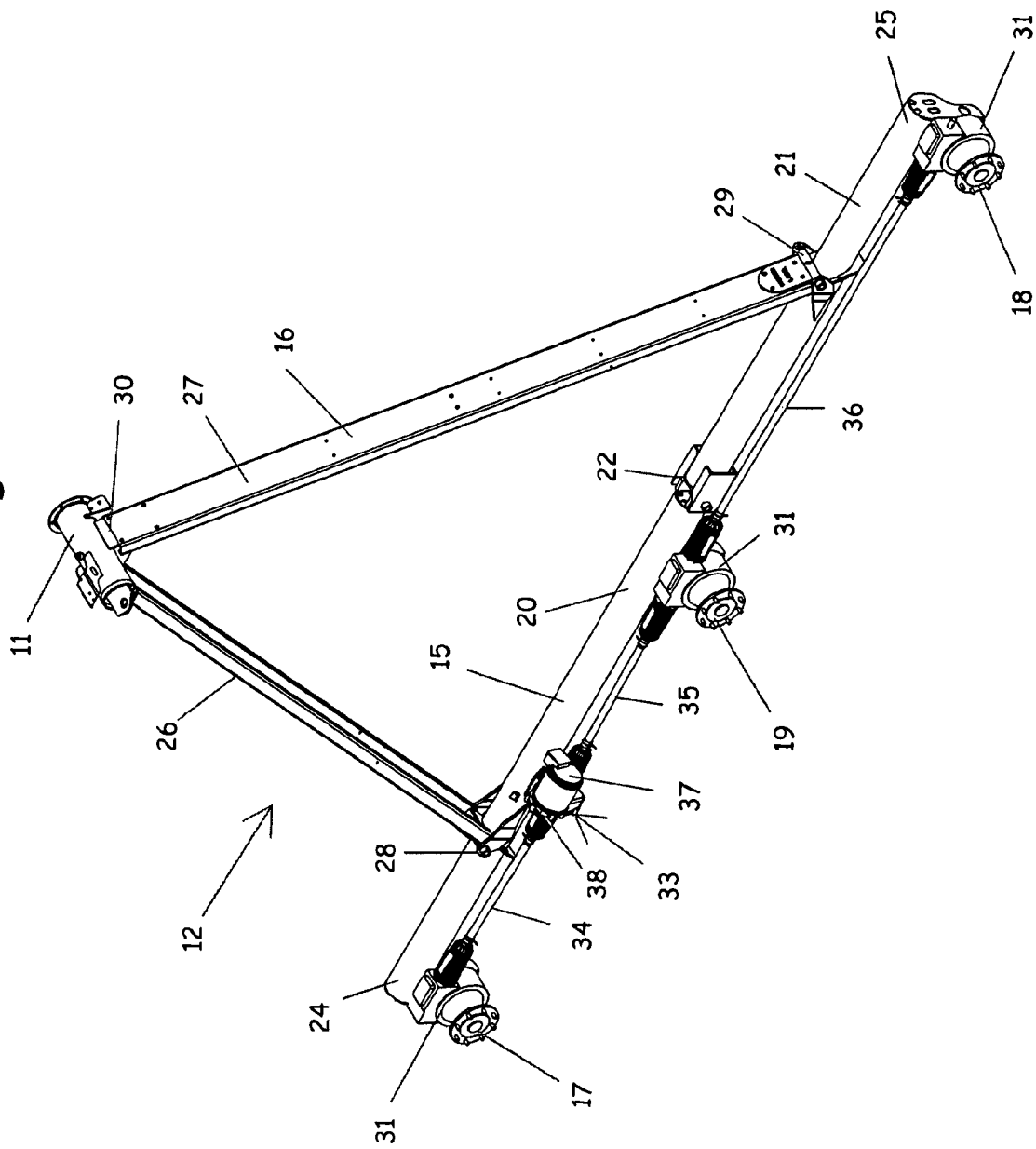
FIG. 6 is a perspective view of one of the articulated drive towers of the sprinkler system with the wheels removed.

The self-propelled irrigation system 10 has an elongated pipeline 11 supported above a field by a plurality of drive towers 12. The irrigation system 10 can be a center pivot system in which the pipeline 11 is connected to a fixed center pivot 13 at the center of a field, as illustrated in FIG. 1. Alternatively, the irrigation system 10 can be a linear move system (not shown) in which the pipeline is carried across a field in a linear manner without a fixed center pivot point. A water supply pipe 14 from a surface water pump or well is connected to the pipeline 11 to supply irrigation water through the pipeline 11 to be distributed over the field. A plurality of sprinkler nozzles or the like are spaced along the pipeline 11 for applying water to the field in a known manner.

At least one of the drive towers 12 of the irrigation system 10 is equipped with an articulated arrangement of drive wheel assemblies according to the present invention. The drive tower 12 has a base beam assembly 15, a tower structure 16 extending above the base beam assembly 15 for supporting the elongated pipeline 11 above the base beam assembly 15, and a plurality of drive wheel assemblies 17, 18, 19 for supporting and propelling the base beam assembly 15 over a field.

The base beam assembly 15 has a first beam member 20 pivotally connected to a second beam member 21 at a first pivot connection 22. The first beam member 20 is rotatable relative to the second beam member 21 about a pivot axis extending in a generally transverse horizontal direction relative to the base beam assembly 15. The first pivot connection 22 provides an articulation between the first and second ends 24, 25 of the base beam assembly 15 (e.g., near the midpoint of the base beam assembly 15).

The tower structure 16 has first and second tower members 26, 27 extending between the elongated pipeline 11 and the base beam assembly 15. The first tower member 26 is pivotally connected at its lower end to the first beam member 20 about a second pivot connection 28. The second tower member 27 is pivotally connected at its lower end to the second beam member 21 about a third pivot connection 29. The second pivot connection 28 is located between the respective ends of the first beam member 20, and the third pivot connection 29 is located between the respective ends of the second beam member 21. The second and third pivot connections 28, 29 are preferably located closer to the respective outer ends 24, 25 of the base beam assembly 15 than to the midpoint of the base beam assembly 15 to balance the weight of the system 10 between the three drive wheel assemblies 17-19. The second and third pivot connections 28, 29 allow rotation of the beam members 20, 21 relative to the tower members 26, 27 about respective pivot axes extending in generally transverse horizontal directions relative to the base beam assembly 15.

The first and second tower members 26, 27 extend upwardly from the second and third pivot connections 28, 29 and converge together at their upper ends to support the elongated water pipeline 11 above the base beam assembly 15. A suitable bracket 30 is used to attach the elongated pipeline 11 to the upper ends of the tower members 26, 27.

The drive wheel assemblies include first and second drive wheel assemblies 17, 18 mounted to the respective ends 24, 25 of the base beam assembly 15, and a third drive wheel assembly 19 mounted to the base beam assembly 15 between the first and second drive wheel assemblies 17, 18. The third drive wheel assembly 19 is mounted to the base beam assembly 15 between the second and third pivot connections 28, 29. The second pivot connection 28 is located between the first and third drive wheel assemblies 17, 19, and the third pivot connection 29 is located between the second and third drive wheel assemblies 18, 19.

The articulation in the base beam assembly 15 provided by the first pivot connection 22 allows the third drive wheel assembly 19 to move vertically relative to the first and second drive assemblies 17, 18 when the drive tower 12 traverses uneven terrain. The second and third pivot connections 28, 29 allow the first and second beam members 20, 21 to pivot relative to the lower ends of the respective tower members 26, 27 when the base beam assembly 15 articulates. The tower structure 16 also flexes slightly to accommodate the small change in distance between the second and third pivot connections 28, 29 as the base beam assembly 15 articulates.

Figure 7:
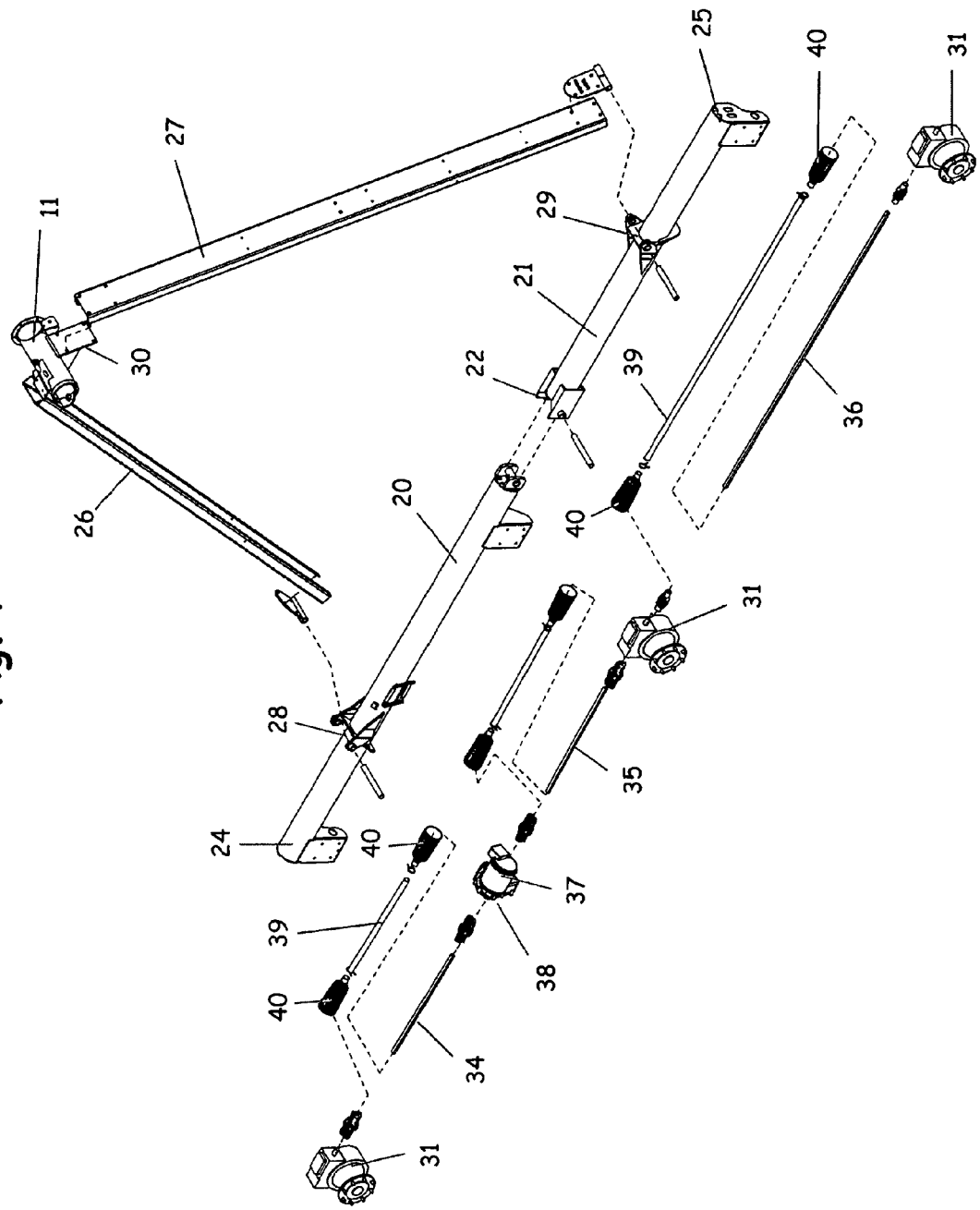
FIG. 7 is an exploded parts view of the articulated drive tower shown in FIG. 6.
Figure 8:
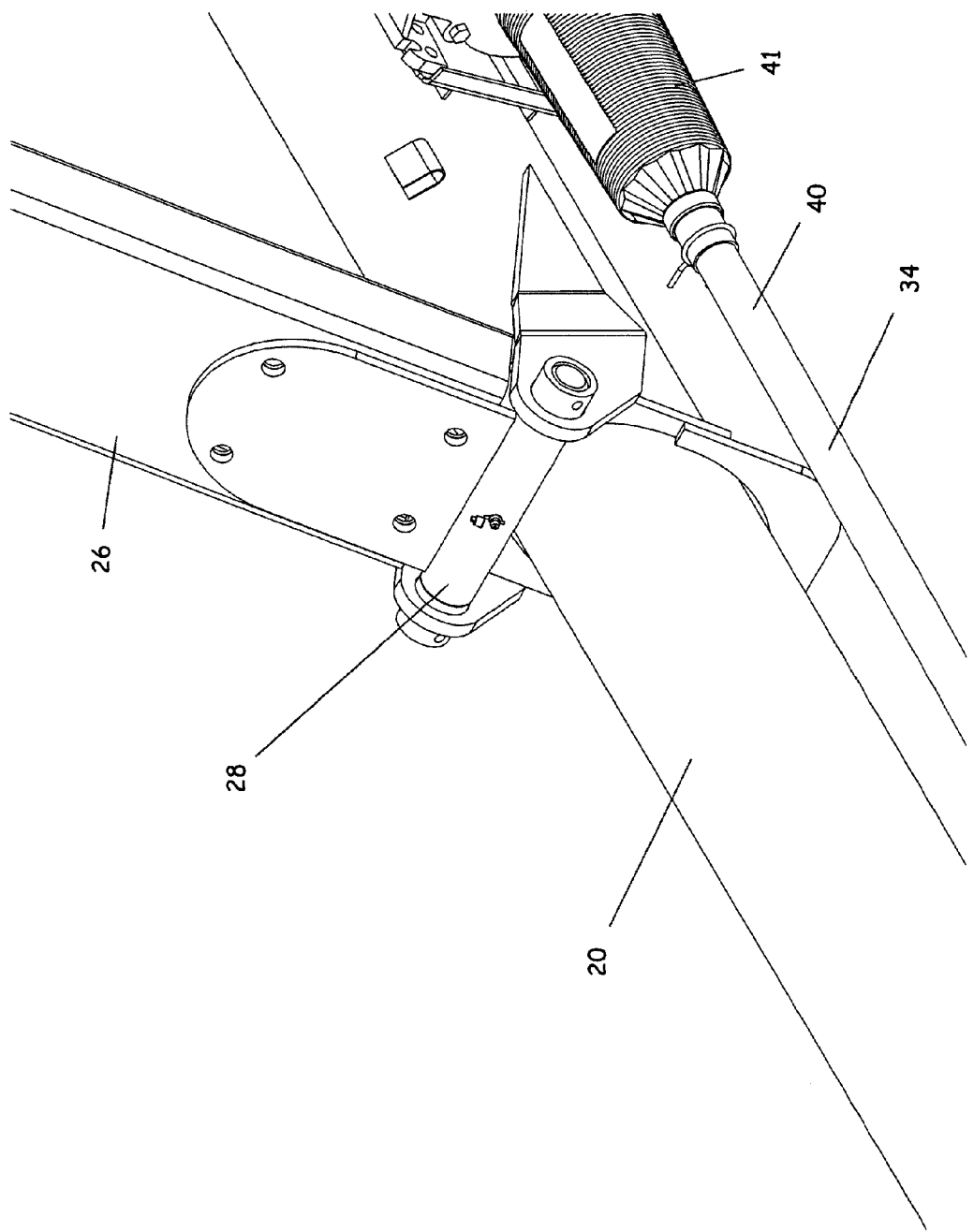
FIG. 8 is a perspective view of one of the tower pivots used in the present invention.
Figure 9:
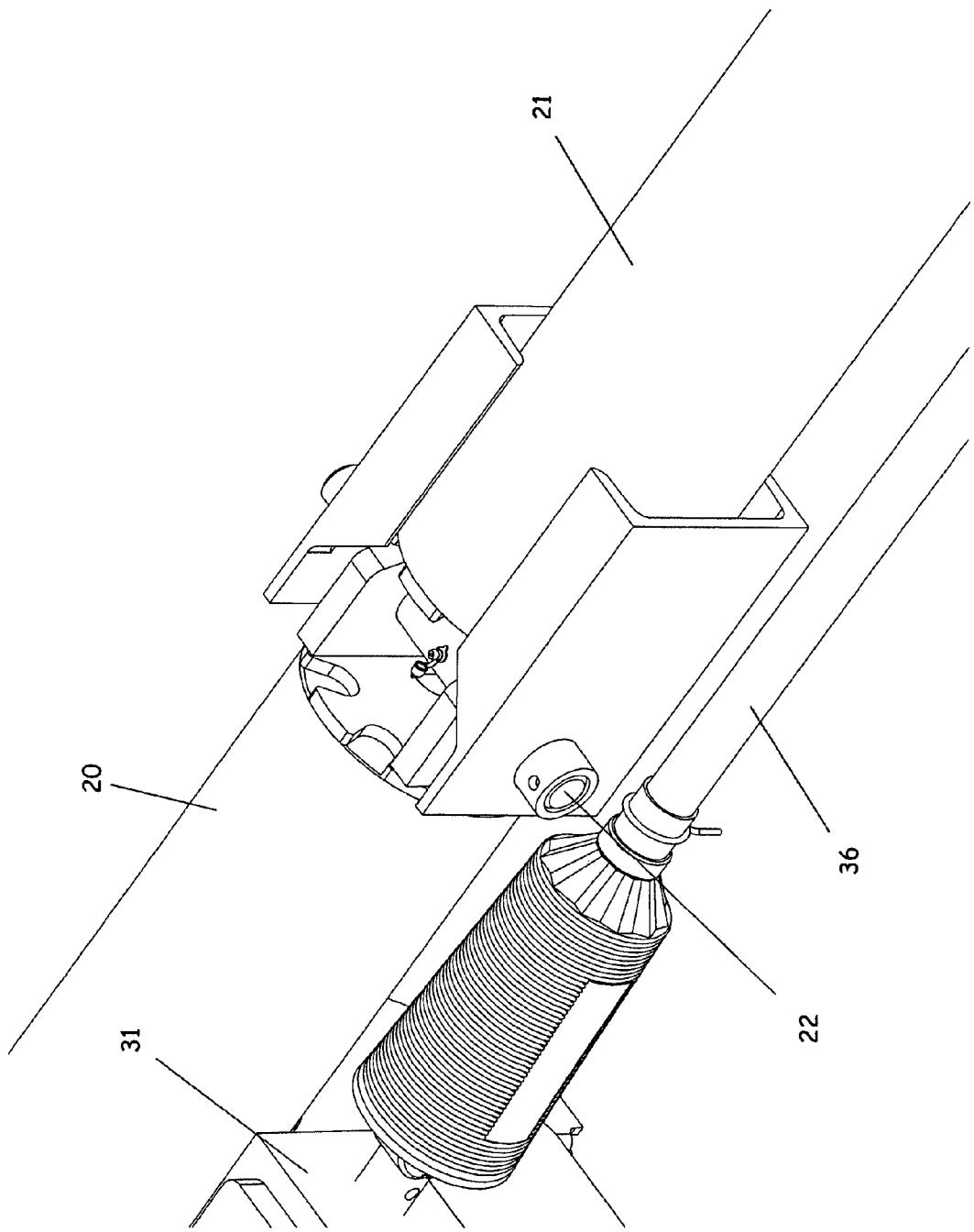
FIG. 9 is a perspective view of a base pivot used in the present invention.

The drive wheel assemblies 17-19 in the illustrated embodiment each include a gear box 31 and a driven wheel 32 connected to an output shaft of the gear box 31. A common drive motor assembly 33 can be provided for driving the drive wheel assemblies 17-19. For example, the first, second and third drive wheel assemblies 17-19 can be interconnected together by a plurality of drive shaft assemblies 34-36 that transfer rotational drive force from a drive motor 37 to the drive wheel assemblies 17-19. The drive shaft assemblies 34-36 each have a shaft 39 surrounded by a protective sleeve 40 and boots 41, as shown in FIG. 7.

In the illustrated embodiment, the drive motor 37 is connected to a main drive gear box 38 having first and second output shafts. A first drive shaft assembly 34 connects the first output shaft of the main drive gear box 38 to the first drive wheel assembly 17. A second drive shaft assembly 35 connects the second output shaft of the main drive gear box 38 to the third wheel drive assembly 19. A third drive shaft assembly 36 connects the third drive wheel assembly 19 to the second wheel drive assembly 18.

In use, the self-propelled irrigation system 10 can be moved over a field by activating the drive motor 37 to drive the first, second and third drive wheel assemblies 17-19 via the drive shaft assemblies 34-36. The weight of the irrigation system 10 is substantially evenly distributed between the first, second and third drive wheel assemblies 17-19 as a result of the arrangement of the pivot connections 22, 28, 29. As the system 10 traverses uneven terrain, the third drive wheel assembly 19 moves vertically relative to the first and second drive wheel assemblies 17, 18 to follow the terrain while maintaining a constant weight distribution between the wheel assemblies 17-19. The articulated drive tower 12 of the present invention can be used in locations where conventional drive towers are prone to getting stuck in the mud and in applications where shallower wheel tracks are desired.

Various changes can be made to the irrigation system 10 illustrated in the drawings without departing from the scope of the invention. For example, the irrigation system can have a combination of conventional drive towers together with one or more articulated drive towers of the present invention. For another example, the drive assemblies can be powered by electrical motors, hydraulic drive motors, or other conventional power units. For yet another example, the drive assemblies can be supported by wheels, tracks, or other suitable wheel substitutes known in the industry. Each drive assembly can be supported by a single wheel or a plurality of wheels.

The articulated drive tower of the present invention provides several advantages over the prior art. The articulated drive tower is able to flex to ensure that all three drive wheels remain in contact with the ground. The articulated drive tower provides better floatation resulting in better traction and shallower tracks because substantially equal loads are carried by each tire on uneven terrain. Shallower tracks are desirable to reduce interference with field operations, such as harvesting. The drive tower also provides added stability on steep elevation changes, such as terraces and washouts.

While the invention has been specifically described in connection with specific embodiments thereof, it is to be understood that this is by way of illustration and not of limitation, and the scope of the appended claims should be construed as broadly as the prior art will permit.

What is claimed is:

1. A drive tower for a self-propelled irrigation system, comprising:
    a base beam assembly comprising a first beam member pivotally connected to a second beam member, said first and second beam members being rotatable relative to each other about a first pivot connection;
    a tower structure comprising first and second tower members, said first tower member being pivotally connected at its lower end to the first beam member about a second pivot connection, said second tower member being pivotally connected at its lower end to the second beam member about a third pivot connection, and said first and second tower members extending upwardly from said second and third pivot connections and converging together to support an elongated water pipeline above the base beam assembly; and
    a plurality of drive assemblies mounted to the base beam assembly for supporting and propelling the base beam assembly over a field;
    wherein said plurality of drive assemblies comprises first and second drive assemblies mounted to respective ends of the base beam assembly, and a third drive assembly mounted to said base beam assembly between said first and second drive assemblies;
    wherein said third drive assembly is mounted to said base beam assembly between said second and third pivot connections; and
    wherein said second pivot connection is located between and spaced from each of said first and third drive assemblies so that a weight from said first tower member is distributed through the base beam assembly to both of the first and third drive assemblies, and wherein said third pivot connection is located between and spaced from each of said second and third drive assemblies so that a weight from said second tower member is distributed through the base beam assembly to both of the second and third drive assemblies.

2. The drive tower according to claim 1, wherein said first, second and third drive assemblies are interconnected together and driven by a common drive motor assembly.

3. The drive tower according to claim 1, wherein said first, second and third pivot connections have respective pivot axes that extend in a generally transverse horizontal direction relative to said base beam assembly.

4. The drive tower according to claim 1, wherein said drive assemblies each comprises a drive gear box, and a driven wheel connected to an output shaft of said drive gear box.

5. The drive tower according to claim 1, wherein said first tower member is pivotally connected to and supported by said first beam member at a location between and spaced from the respective ends of said first beam member, and wherein said second tower member is pivotally connected to and supported by said second beam member at a location between and spaced from the respective ends of said second beam member.

6. The drive tower according to claim 1, wherein said second and third pivot connections are located closer to said first and second drive assemblies, respectively, than to said third drive assembly to substantially balance a weight of the system between the three drive assemblies.

7. A drive tower for a self-propelled irrigation system, comprising:
    a base beam assembly comprising a first beam member pivotally connected to a second beam member, said first and second beam members being rotatable relative to each other about a first pivot connection;
    a tower structure comprising first and second tower members, said first tower member being pivotally connected at its lower end to the first beam member about a second pivot connection, said second tower member being pivotally connected at its lower end to the second beam member about a third pivot connection, and said first and second tower members extending upwardly from said second and third pivot connections and converging together to support an elongated water pipeline above the base beam assembly; and
    a plurality of drive assemblies mounted to the base beam assembly for supporting and propelling the base beam assembly over a field;
    wherein said plurality of drive assemblies comprises first and second drive assemblies mounted to respective ends of the base beam assembly, and a third drive assembly mounted to said base beam assembly between said first and second drive assemblies;
    wherein said first, second and third drive assemblies are interconnected together and driven by a common drive motor assembly; and
    wherein said drive motor assembly comprises a motor and a main drive gear box, and wherein said drive assemblies are interconnected by a first drive shaft connecting the main drive gear box to the first drive assembly, a second drive shaft connecting the main drive gear box to the third drive assembly, and a third drive shaft connecting the third drive assembly to the second drive assembly.

8. A drive tower for a self-propelled irrigation system, comprising:
    a base beam assembly;
    a tower structure supported by and extending above said base beam assembly for supporting an elongated water pipeline above the base beam assembly;
    a plurality of drive assemblies for supporting and propelling the base beam assembly over a field, said drive assemblies comprising first and second drive assemblies mounted to respective first and second ends of the base beam assembly, and a third drive assembly mounted to the base beam assembly between said first and second drive assemblies; and
    said base beam assembly being articulated at a location between its first and second ends to allow said third drive assembly to move vertically relative to said first and second drive assemblies when traversing uneven terrain;
    wherein said tower structure comprises first and second tower members, said first tower member being pivotally connected at its lower end to the first beam member about a second pivot connection, said second tower member being pivotally connected at its lower end to the second beam member about a third pivot connection, and said first and second tower members extending upwardly from said second and third pivot connections and converging together to support an elongated water pipeline above the base beam assembly;

wherein said third drive assembly is mounted to said base beam assembly between said second and third pivot connections; and wherein said second pivot connection is located between and spaced from each of said first and third drive assemblies so that a weight from said first tower member is distributed through the base beam assembly to both of the first and third drive assemblies, and wherein said third pivot connection is located between and spaced from each of said second and third drive assemblies so that a weight from said second tower member is distributed through the base beam assembly to both of the second and third drive assemblies.

9. The drive tower according to claim 8, wherein said base beam assembly comprises a first beam member pivotally connected to a second beam member at a first pivot connection, said first and second beam members being rotatable relative to each other about a pivot axis extending in a generally transverse horizontal direction relative to said base beam assembly.

10. The drive tower according to claim 8, wherein said second and third pivot connections have respective pivot axes that extend in a generally transverse horizontal direction relative to said base beam assembly.

11. The drive tower according to claim 8, wherein said first tower member is pivotally connected to and supported by said first beam member at a location between and spaced from the respective ends of said first beam member, and wherein said second tower member is pivotally connected to and supported by said second beam member at a location between and spaced from the respective ends of said second beam member.

12. The drive tower according to claim 8, wherein said drive assemblies each comprises a drive gear box, and a driven wheel connected to an output shaft of said drive gear box.

13. The drive tower according to claim 8, wherein said first, second and third drive assemblies are interconnected together and driven by a common drive motor assembly.

14. The drive tower according to claim 8, wherein said second and third pivot connections are located closer to said first and second drive assemblies, respectively, than to said third drive assembly to substantially balance a weight of the system between the three drive assemblies.

15. A drive tower for a self-propelled irrigation system, comprising:
a base beam assembly;
a tower structure supported by and extending above said base beam assembly for supporting an elongated water pipeline above the base beam assembly;
a plurality of drive assemblies for supporting and propelling the base beam assembly over a field, said drive assemblies comprising first and second drive assemblies mounted to respective first and second ends of the base beam assembly, and a third drive assembly mounted to the base beam assembly between said first and second drive assemblies; and
said base beam assembly being articulated at a location between its first and second ends to allow said third drive assembly to move vertically relative to said first and second drive assemblies when traversing uneven terrain;
wherein said first, second and third drive assemblies are interconnected together and driven by a common drive motor assembly; and
wherein said drive motor assembly comprises a motor and a main drive gear box, and wherein said drive assemblies are interconnected by a first drive shaft connecting the main drive gear box to the first drive assembly, a second drive shaft connecting the main drive gear box to the third drive assembly, and a third drive shaft connecting the third drive assembly to the second drive assembly.

16. A self-propelled irrigation system, comprising:
an elongated pipeline supported above a field by a plurality of drive towers, at least one of said drive towers comprising:
a base beam assembly;
a tower structure supported by and extending above said base beam assembly for supporting the elongated water pipeline above the base beam assembly;
a plurality of drive assemblies for supporting and propelling the base beam assembly over a field, said drive assemblies comprising first and second drive assemblies mounted to respective first and second ends of the base beam assembly, and a third drive assembly mounted to the base beam assembly between said first and second drive assemblies; and
said base beam assembly being articulated at a location between its first and second ends to allow said third drive assembly to move vertically relative to said first and second drive assemblies when traversing uneven terrain;
wherein said tower structure comprises first and second tower members, said first tower member being pivotally connected at its lower end to the first beam member about a second pivot connection, said second tower member being pivotally connected at its lower end to the second beam member about a third pivot connection, and said first and second tower members extending upwardly from said second and third pivot connections and converging together to support an elongated water pipeline above the base beam assembly;
wherein said third drive assembly is mounted to said base beam assembly between said second and third pivot connections; and
wherein said second pivot connection is located between and spaced from each of said first and third drive assemblies so that a weight from said first tower member is distributed through the base beam assembly to both of said first and third drive assemblies, and wherein said third pivot connection is located between and spaced from each of said second and third drive assemblies so that a weight from said second tower member is distributed through the base beam assembly to both of said second and third drive assemblies.

17. The self-propelled irrigation system according to claim 16, wherein said base beam assembly comprises a first beam member pivotally connected to a second beam member at a first pivot connection, said first and second beam members being rotatable relative to each other about a pivot axis extending in a generally transverse horizontal direction relative to said base beam assembly.

18. The self-propelled irrigation system according to claim 16, wherein said second and third pivot connections have respective pivot axes that extend in a generally transverse horizontal direction relative to said base beam assembly.

19. The self-propelled irrigation system according to claim 16, wherein said second and third pivot connections are located closer to said first and second drive assemblies, respectively, than to said third drive assembly to substantially balance a weight of the system between the three drive assemblies.

* * * * *